J. E. DIETZ.
LANTERN HANDLE.
APPLICATION FILED MAR. 11, 1912.
1,035,550.
Patented Aug. 13, 1912.
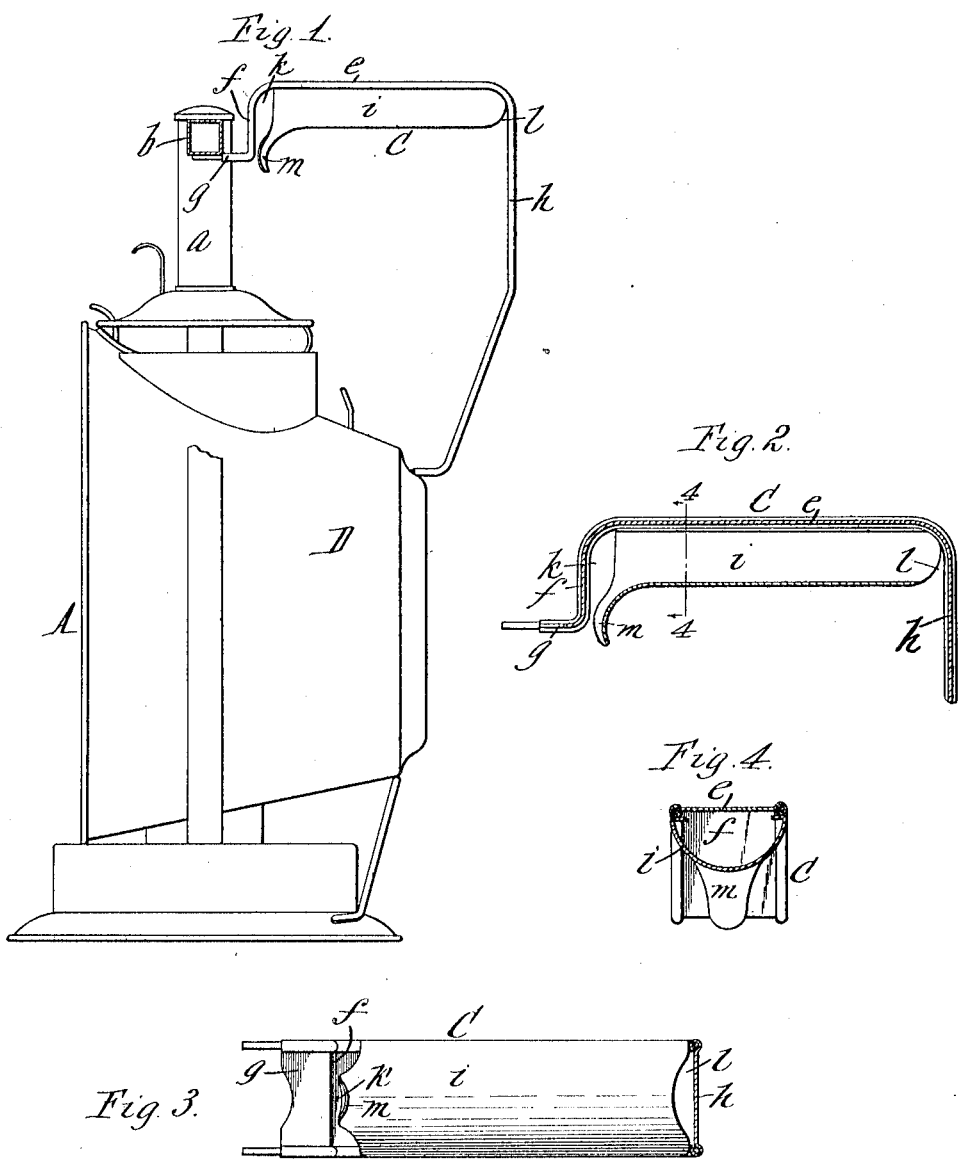

UNITED STATES PATENT OFFICE.

JOHN E. DIETZ, OF NEW YORK, N. Y., ASSIGNOR TO R. E. DIETZ COMPANY, OF NEW YORK, N. Y.

LANTERN-HANDLE.

1,035,550.  Specification of Letters Patent.  Patented Aug. 13, 1912.

Application filed March 11, 1912. Serial No. 682,984.

*To all whom it may concern:*

Be it known that I, JOHN E. DIETZ, a citizen of the United States, residing at New York, in the county of New York and State of New York, have invented a new and useful Improvement in Lantern-Handles, of which the following is a specification.

This invention relates to handles for that class of tubular lanterns which are provided with a rigid handle extending backwardly from the upper portion of the tubular lantern frame, such for instance, as the lanterns which are provided with reflecting hoods and which are used by car inspectors and track walkers. In these lanterns the grip portion of the handle is secured at its front end to the upper portions of the air tubes and becomes very hot, particularly when the lantern has been allowed to stand still for a considerable time.

The object of the invention is to construct the grip portion of the handle in such manner that it will remain cool and that contact of the hand with the hot front portion of the handle is prevented.

In the accompanying drawings: Figure 1 is a side elevation, partly in section, of a tubular lantern provided with this improved handle. Fig. 2 is a longitudinal section of the grip portion of the handle. Fig. 3 is a bottom plan view of the grip portion of the handle. Fig. 4 is a cross section on line 4—4, Fig. 2.

Like reference characters refer to like parts in the several figures.

A represents a tubular lantern of usual construction, $a$ the upper central air tube, and $b$ the horizontal tube connected with the upper end thereof.

C represents the handle which is connected at its upper front end with the upper portion of the tubular lantern frame and at its lower end with the hood D. This handle comprises a flat horizontal part $e$, a downwardly extending front part $f$ which is arranged adjacent to and in rear of the horizontal tube $b$, a forwardly extending front portion $g$ which straddles the round central tube $a$ and is secured to this tube by soldering or otherwise, and a rear portion $h$ which extends downwardly from the rear end of the horizontal portion $e$ to the hood. The grip portion of the handle is formed by the horizontal top part $e$ and a rounded lower part $i$ which is secured along its side edges to the under side of the top part. This rounded lower part does not extend to the upright front part $f$ or to the upright rear part $h$ of the handle but is separated from these parts by spaces $k$ $l$ which form air passages through which the air can pass into and from the cavity of the hollow handle formed by the flat top part $e$ and the rounded lower part $i$. The air circulates freely through this cavity and keeps the grip part of the handle cool, and the top part $e$, front part $f$ and rear part $h$ of the handle protect these openings at the ends of the grip portion from rain, snow, cinders, &c. The lower rounded part $i$ of the grip portion is provided adjacent to the upright front part $f$ of the handle with a downwardly extending lip or guard $m$ which prevents contact of the hand with the front part $f$ of the handle or with the upper part of the lantern which parts are liable to become very hot, particularly in lanterns which are provided with large burners.

I claim as my invention:

1. The combination with a lantern, of a handle having a grip portion comprising a top part and a lower part secured thereto and provided with air inlets at its ends, said lower part being provided at its front end with a downwardly extending guard, substantially as set forth.

2. The combination with a tubular lantern, of a rigid handle having upright front and rear parts and a connecting grip portion comprising a top part and a lower part which is separated at its front end from the adjacent upright part and provided in rear thereof with a downwardly extending guard, substantially as set forth.

Witness my hand in the presence of two subscribing witnesses.

JOHN E. DIETZ.

Witnesses:
HOWARD L. FLETCHER,
F. W. VAN DUYN.

Copies of this patent may be obtained for five cents each, by addressing the "Commissioner of Patents, Washington, D. C."